Aug. 2, 1932.                    J. DE MOOY                      1,869,411
                            AUTOMATIC COUPLING VALVE
                               Filed July 2, 1930
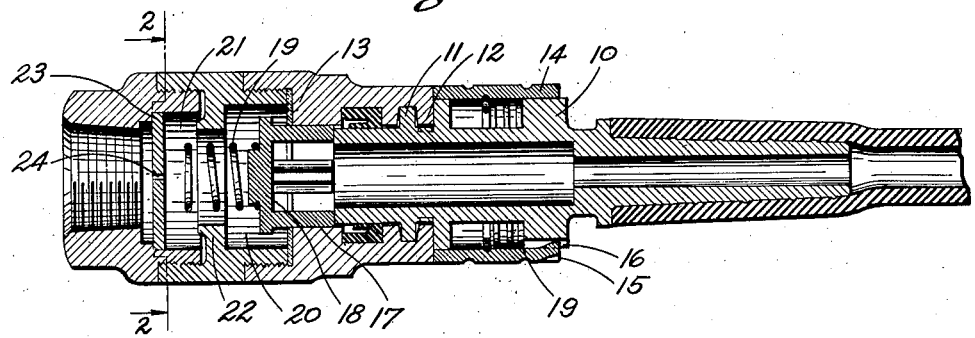
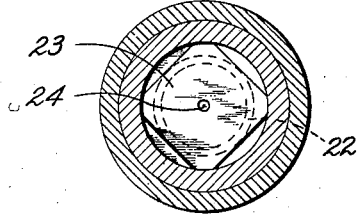
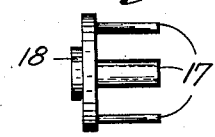
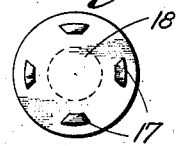
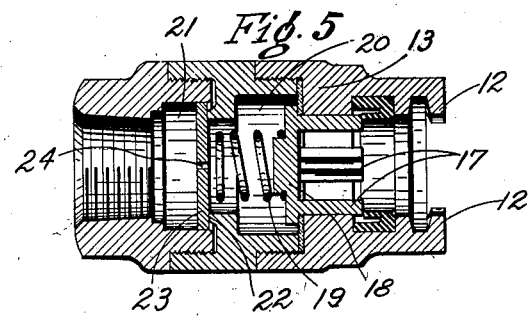
Inventor
JOHN DE MOOY
Richey & Watts
By
Attorneys Patented Aug. 2, 1932

1,869,411

UNITED STATES PATENT OFFICE

JOHN DE MOOY, OF CLEVELAND, OHIO, ASSIGNOR TO THE CLEVELAND PNEUMATIC TOOL COMPANY, OF CLEVELAND, OHIO, A CORPORATION OF OHIO

AUTOMATIC COUPLING VALVE

Application filed July 2, 1930. Serial No. 465,391.

This invention relates broadly to hose coupling and more specifically to improvements in couplings of the type which are adapted to prevent the escape of fluid when the separable members thereof are disunited.

In couplings of this character heretofore in use it was customary to incorporate therein a valve which was seated by the fluid pressure in the line when the coupling members were separated. It was also the practice and, in apparatus of this order, necessary to dislodge the valve from its seat when the union of the coupling members was effected. This practice however was found objectionable as the fluid pressure on the valve was frequently so great that the operator was unable to move the valve from its seat. One of the objects, therefore, of the present invention is to overcome the disadvantages of the couplings heretofore in use by providing a valve construction which is susceptible of ready connection with minimized physical effort to effect the same.

Another object of the invention is to provide a coupling valve, the closing of which will be automatically accomplished upon breaking or parting of the fluid line while the coupling members remain interlocked.

Another object of the invention is to provide a coupling valve which is simple in construction, dependable in operation and economic of manufacture.

Other objects and advantages more or less ancillary to the foregoing reside in the specific construction and aggroupment of the elements peculiar to this structure, as will become apparent from a more complete examination of this specification.

In the drawing wherein like reference characters designate like parts throughout the several views:

Fig. 1 is a longitudinal sectional view of the preferred form of the coupling illustrating the relation of the several parts thereof when the two coupling members are united;

Fig. 2 is a transverse sectional view thereof taken on a plane indicated by the line 2—2 of Fig. 1;

Figs. 3 and 4 are side and end elevational views, respectively, of the finger valve member shown as detached from the coupling assembly; and Fig. 5 is a longitudinal sectional view of the socket member of the coupling showing the relation of the several parts thereof when the plug is detached therefrom and the valves are positioned to prevent escape of fluid.

Referring now to the drawing, the coupling comprises two cylindrical bodies, one of which is organized to retain the valvular mechanism and to support a second member in interlocked axial alignment. The supported member or plug 10 is provided with lugs 11 which are adapted to engage segmental ledges 12 formed in the inner wall of the socket member 13. Affixation of the two parts is attained by inserting the lugs through the interrupted portions of the ledge and then engaging the lugs behind the ledges by a slight rotative movement of the plug. Relative rotative movement of the two members of the interlocked assembly, is prevented by the engagement of clutch teeth formed in the end wall of the socket which cooperate with a complementary clutch element formed on a spring pressed sleeve 14, mounted on the plug. The sleeve 14 is provided with a depressed tongue or lug 15, which lies within a groove 16, in the plug to prevent rotative movement of the sleeve upon the plug and to accommodate the longitudinal movement of the sleeve and afford reentrant engagement of the clutch elements.

The inner end of the plug 10 in its assembled relation with the socket member 13, abuts the fingers 17 of the valve 18 and sustains the valve, in its open position.

Secured to the valve 18 and projecting in axial alignment therefrom is a helical spring 19, the purpose of which will fully appear hereinafter.

Within the socket member 13 are intercommunicating cylindrical chambers 20 and 21 which are defined from each other by an annular valve seat 22. A floating valve 23 is disposed within the chamber 21 and is adapted for limited axial movement therein. As shown in Figs. 1 and 2 the valve 23 comprises a substantially square plate the corners of which are slightly rounded to accommodate ready axial movement thereof in the chamber 21. The diameter of the annular valve seat 22 is less than any transverse dimension of the valve 23 to eliminate flow around the sides of the valve when it is held upon the seat. However, a small aperture 24 is provided in the center of valve 23 to permit a restricted flow of fluid therethrough when valve 23 is in closed position.

In normal operation of the device, that is, when the two coupling members are in assembled relation, fluid flows into the socket member and around the sides of the floating valve 23, thence into chamber 20, around valve 18 and finally through the plug member. The pressure in the line being substantially uniform, valve 23 may float within chamber 21 but the closing thereof is precluded by the spring 19 which projects into chamber 21 beyond valve seat 22.

As shown in Fig. 5, the withdrawal of the plug 10 will permit the compressed fluid in the line to drive the valve 18 upon its seat thus arresting the escape of fluid from the line. Fluid pressure within the chamber 20 is maintained, however, through the aperture 24 in the valve 23 and the valve 18 is thus sustained in its seated position.

In reuniting the members of the coupling initial insertion of the plug 10 into the socket will cause the end of the plug 10 to engage the fingers 17 and the valve 18 will be slightly raised from its seat. The on rush of escaping fluid past the valve 23 will quickly seat this valve and upon seating of this valve the pressure in the chamber 20 will drop considerably. The effort that will then be required to open the valve 18 will be relatively slight as the fluid in the chamber 20 escapes past the valve 18 the restricted opening 24 in the closure member 23 precludes any appreciable renewal of pressure within the chamber 20 while this valve is seated. Upon the initial translation of the valve 18 the spring 19 will be advanced to abutting engagement with the valve 23 and will be compressed and held thereupon until a sufficient volume of the compressed fluid has passed through the aperture 24 and into the adjacent conduit to effect a hydrostatic balance throughout the entire line. When the fluid pressure in the line is substantially equalized the spring 19 striving to regain its unstressed form will effectuate the opening of the valve 23 and the fluid will then be allowed to by-pass the edges of the valve.

Closing of valve 23 will also result upon breaking or parting of the fluid line at any point below the plug member. When such break occurs the fluid pressure in the plug member, and hence in chamber 20, will fall materially below the pressure of the fluid entering the socket member. This differential in pressure on the opposite sides of the valve 23 will effect the seating of the valve which seating will be accommodated by the compression of spring 19. Although a small amount of fluid will flow through the restricted aperture 24 yet this amount will be so slight that the pressure in the line will not be appreciably diminished.

Although the foregoing description is necessarily of a detailed character in order to completely set forth the invention, it is to be understood that the specific terminology is not intended to be restrictive or confining and it is further understood that various rearrangements of parts and modifications of structural detail may be resorted to without departing from the scope or spirit of the invention as herein claimed.

I claim:

1. A coupling comprising a plug member and a socket member, said socket member having a pair of chambers therein defined from each other by an annular valve seat, a valve disposed in each of said chambers, resilient means on one of said valves for resisting lodgement of the other valve on said valve seat when the pressure on opposite sides of said latter valve is substantially equal but permitting the seating of said latter valve when a differential pressure of substantial amount on opposite sides of said latter valve is attained.

2. A coupling comprising a plug member and a socket member, a valve mounted in said socket member and adapted to be closed by fluid pressure bearing on one side thereof when said plug member is disassociated from said socket member, an abutment on said plug member for opening said valve when said plug member is associated with said socket member, a second valve in said socket member having an aperture extending therethrough for equalizing the pressure on opposite sides of the same, said last mentioned valve being normally independent of said first mentioned valve, and resilient means associated with said first mentioned valve for normally holding said second mentioned valve open when said first mentioned valve is in open position, said means being rendered inoperative when said first mentioned valve is closed.

3. A coupling comprising a socket member and a plug member, a valve in said socket member adapted to be closed by fluid pressure on one side thereof when said plug member is disassociated from said socket member, a second valve in said socket member having an aperture therethrough for equalizing the pressure on opposite sides of the same when said first mentioned valve is closed, an abutment on said plug member adapted to engage said first mentioned valve to open the same when said plug member is associated with said socket member, said second mentioned valve being adapted to be closed by fluid pressure on one side thereof when said first mentioned valve member is initially opened and spring means associated with said first mentioned valve for holding said second mentioned valve open when said first mentioned valve is open.

4. In a coupling, a plug member and a socket member, a pair of valve seats in said socket member, a valve associated with one of said seats and adapted to be closed by fluid pressure when said plug member is removed from said socket member, means for opening said valve on insertion of said plug member in said socket member, a second valve associated with the other valve, said last mentioned valve having an aperture extending therethrough for equalizing the pressure on opposite sides of the same when said first mentioned valve is on its seat, and a spring connected to said first mentioned valve and projecting beyond the valve seat of said second mentioned valve when said first mentioned valve is open, said spring being sufficiently short to fall short of said valve seat when said first mentioned valve is closed.

5. A coupling comprising a pair of detachable members having passages therethrough arranged to form a continuous passage when the members are attached, a valve in one of said members arranged to be closed by fluid pressure acting thereon, means for unseating said valve when the members are attached, a second valve in the member carrying the first valve, said second valve being arranged to normally float in its chamber, means for causing the second valve to be seated temporarily when the first valve is opened.

6. A coupling comprising a pair of detachable members having passages therethrough arranged to form a continuous passage when the members are attached, a valve in one of said members arranged to be closed by fluid pressure acting thereon, means for unseating said valve when the members are attached, a second valve in the member carrying the first valve, said second valve being arranged to normally float in its chamber, an aperture in said second valve, a spring between the valves, said second valve being positioned anteriorly of the first valve in the direction of fluid flow.

In testimony whereof I hereunto affix my signature this 9 day of June, 1930.

JOHN DE MOOY.